Oct. 24, 1939.   S. C. LYON   2,177,369
INSULATION FOR OIL STORAGE TANKS
Filed Dec. 16, 1936

Scott C. Lyon Inventor
By P. L. Young Attorney

Patented Oct. 24, 1939

2,177,369

UNITED STATES PATENT OFFICE 2,177,369

INSULATION FOR OIL STORAGE TANKS

Scott C. Lyon, Bexley, Ohio, assignor to Standard Oil Development Company, a corporation of Delaware Application December 16, 1936, Serial No. 116,096

2 Claims. (Cl. 220—1)

This invention relates to insulation for liquid storage receptacles, the primary object being to provide an oil storage tank with improved means of stopping the loss of heat from the oil to the atmosphere.

In the refining of the petroleum, it is very often desirable to keep certain fractions of the oil in a liquid condition so that they may be readily removed from the storage tanks and blended with other oils or treated as such. These fractions, when first obtained by distillation, are generally of low viscosity while maintained at the high temperatures, but upon cooling, they become very viscous and it is often found that they must be reheated before they can be pumped or removed from the storage tanks by other means. According to this invention, it has been found that an oil storage tank may be so constructed that the oil itself will serve as the insulating material.

Figure 1:
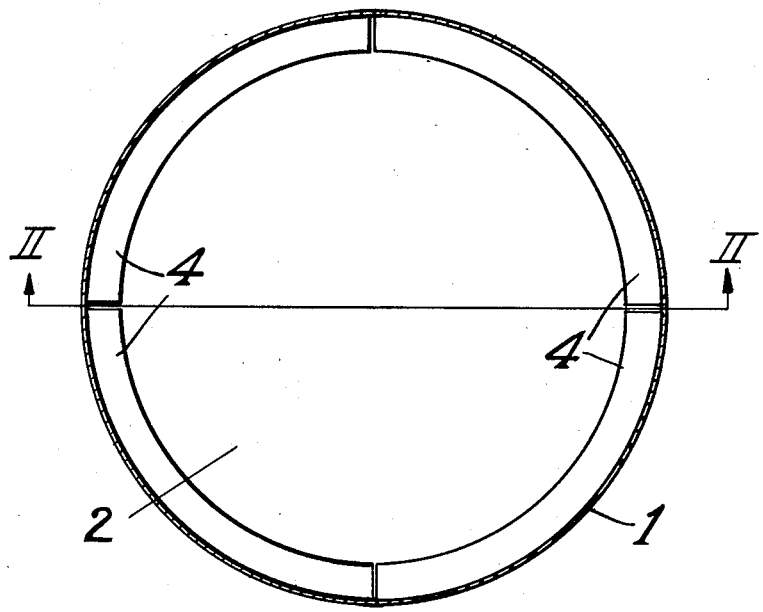
Figure 2:
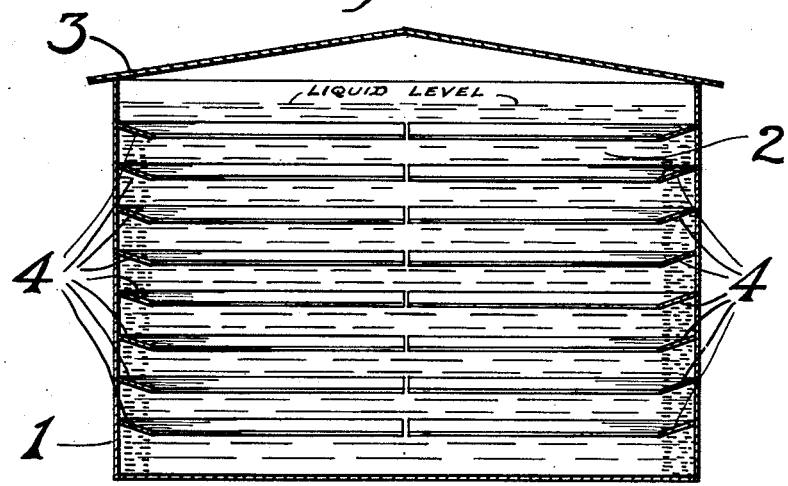

The invention will be fully understood from the following description taken in connection with the drawing in which, Fig. 1 is a top plan view of the storage tank constructed in accordance with the invention, and Fig. 2 is a vertical transverse sectional view taken at II—II of Fig. 1.

Referring to the drawing, reference numeral 1 designates a tank which may be cylindrical in form and which is adapted to contain a liquid 2, such as oil or the like. Other types of tanks may also be used according to this invention, such as those of square or rectangular shape. Tank 1 may be provided with a roof 3. Baffles 4 are attached to the walls of tank 1 and project outwardly and downwardly. The baffles insure a stagnant layer of liquid along the walls of the tank. These baffles are slanted downwardly sufficiently to permit the complete drainage of the oil or other liquid on emptying the tank.

The stagnant layer of liquid retained by the baffles restrains the convection flow of the liquids adjacent to the walls of the tank, whereby most of the heat is lost by conduction through the said walls. These stagnant layers are gradually cooled and serve as insulation between the liquid in the tank and the atmosphere outside the walls of the tank. The cooling of the liquid in the tank is greatly retarded by the insulation furnished by this stagnant layer. The liquid stored in the tank may be kept at a uniform temperature if desired by means of heating coils or other heat-furnishing mediums with very little loss of heat to the atmosphere. The insulation is generally sufficient to keep the liquid hot within the desired temperature range under prolonged periods of time without outside means of heating.

While a preferred embodiment of the invention has been shown and described, it will be understood that various modifications can be made therein within the scope of the invention, and such modifications are intended to be covered by the appended claims.

I claim:

1. In combination with a storage tank, a series of baffles placed in spaced relation to the bottom of the tank, attached to the walls of the tank and extending inwardly and downwardly from said walls of the tank.

2. In combination with a storage tank for liquids, a means for insulating said tank comprising a series of peripheral compartments disposed vertically of the tank walls, opening downwardly and inwardly into communication with the liquid contents of said tank and providing for a layer of liquid immediately adjacent the tank walls which layer is substantially free of convection currents.

SCOTT C. LYON.